(12) United States Patent
Horiuchi et al.

(10) Patent No.: US 12,124,898 B2
(45) Date of Patent: Oct. 22, 2024

(54) IMAGE FORMING APPARATUS AND IMAGE PROCESSING APPARATUS FOR DECIDING AMOUNT OF REDUCTION OF EXPOSURE AMOUNT INDICATED BY IMAGE DATA

(71) Applicant: CANON KABUSHIKI KAISHA, Tokyo (JP)

(72) Inventors: Yuki Horiuchi, Shizuoka (JP); Go Araki, Shizuoka (JP); Go Shindo, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/237,178

(22) Filed: Aug. 23, 2023

(65) Prior Publication Data

US 2024/0070420 A1    Feb. 29, 2024

(30) Foreign Application Priority Data

Aug. 24, 2022    (JP) ................... 2022-133520

(51) Int. Cl.
*G06K 15/02*    (2006.01)
*G03G 15/043*    (2006.01)

(52) U.S. Cl.
CPC ....... *G06K 15/1823* (2013.01); *G03G 15/043* (2013.01)

(58) Field of Classification Search
CPC .. G06K 15/1823; G03G 15/043; G03G 13/22; G03G 15/102; G03G 15/22; G03G 21/0005; G03G 2221/0021; G03G 5/005; G03G 5/0637; G03G 5/0638; G03G 5/067; B41M 5/0029

USPC ................................. 358/1.15, 3.26
See application file for complete search history.

(56) References Cited

U.S. PATENT DOCUMENTS

| | | | | |
|---|---|---|---|---|
| 6,961,462 B2 * | 11/2005 | Watanabe | ............... | G06T 9/005 382/164 |
| 7,864,386 B2 * | 1/2011 | Tanimoto | ................. | H04N 1/48 358/448 |
| 8,630,561 B2 * | 1/2014 | Sugiyama | .......... | G03G 15/0258 399/100 |
| 9,298,124 B2 | 3/2016 | Araki et al. | | |
| 10,216,126 B2 * | 2/2019 | Obayashi | ........... | G03G 15/2039 |
| 10,990,053 B2 | 4/2021 | Araki et al. | | |
| 11,604,422 B2 * | 3/2023 | Araki | ................... | G03G 15/043 |
| 2006/0119907 A1 * | 6/2006 | Takahashi | .......... | H04N 1/00015 358/504 |

(Continued)

FOREIGN PATENT DOCUMENTS

JP    2016-91009 A    5/2016

*Primary Examiner* — Negussie Worku
(74) *Attorney, Agent, or Firm* — Venable LLP

(57) ABSTRACT

An image forming apparatus includes a unit configured to determine a first region, which is within a range from where a distance from a first edge of an image is a first value to a second value, and a second region, which is within a range from where a distance from the first edge is the second value to a third value; and a decision unit configured to, for each of a plurality of first pixels included in the first region and a plurality of second pixels included in the second region, decide an amount of reduction from an exposure amount, wherein the decision unit makes the amount of reduction of each of the plurality of first pixels greater than the amount of reduction of each of the plurality of second pixels.

19 Claims, 14 Drawing Sheets

(56) References Cited

U.S. PATENT DOCUMENTS

| | | | |
|---|---|---|---|
| 2012/0099879 A1* | 4/2012 | Aslam | G03G 15/081 |
| | | | 399/53 |
| 2012/0251141 A1* | 10/2012 | Henderson | G03G 15/5062 |
| | | | 399/49 |
| 2016/0274483 A1* | 9/2016 | Araki | G03G 15/043 |
| 2016/0277612 A1* | 9/2016 | Kubo | H04N 1/121 |
| 2017/0139343 A1* | 5/2017 | Matsuda | G03G 15/043 |
| 2018/0224768 A1* | 8/2018 | Araki | H04N 1/00 |
| 2020/0019082 A1* | 1/2020 | Ichikawa | G03G 15/5058 |
| 2022/0252998 A1* | 8/2022 | Araki | G03G 15/043 |
| 2023/0384725 A1* | 11/2023 | Sone | G03G 15/5058 |
| 2024/0070420 A1* | 2/2024 | Horiuchi | G03G 15/043 |

* cited by examiner

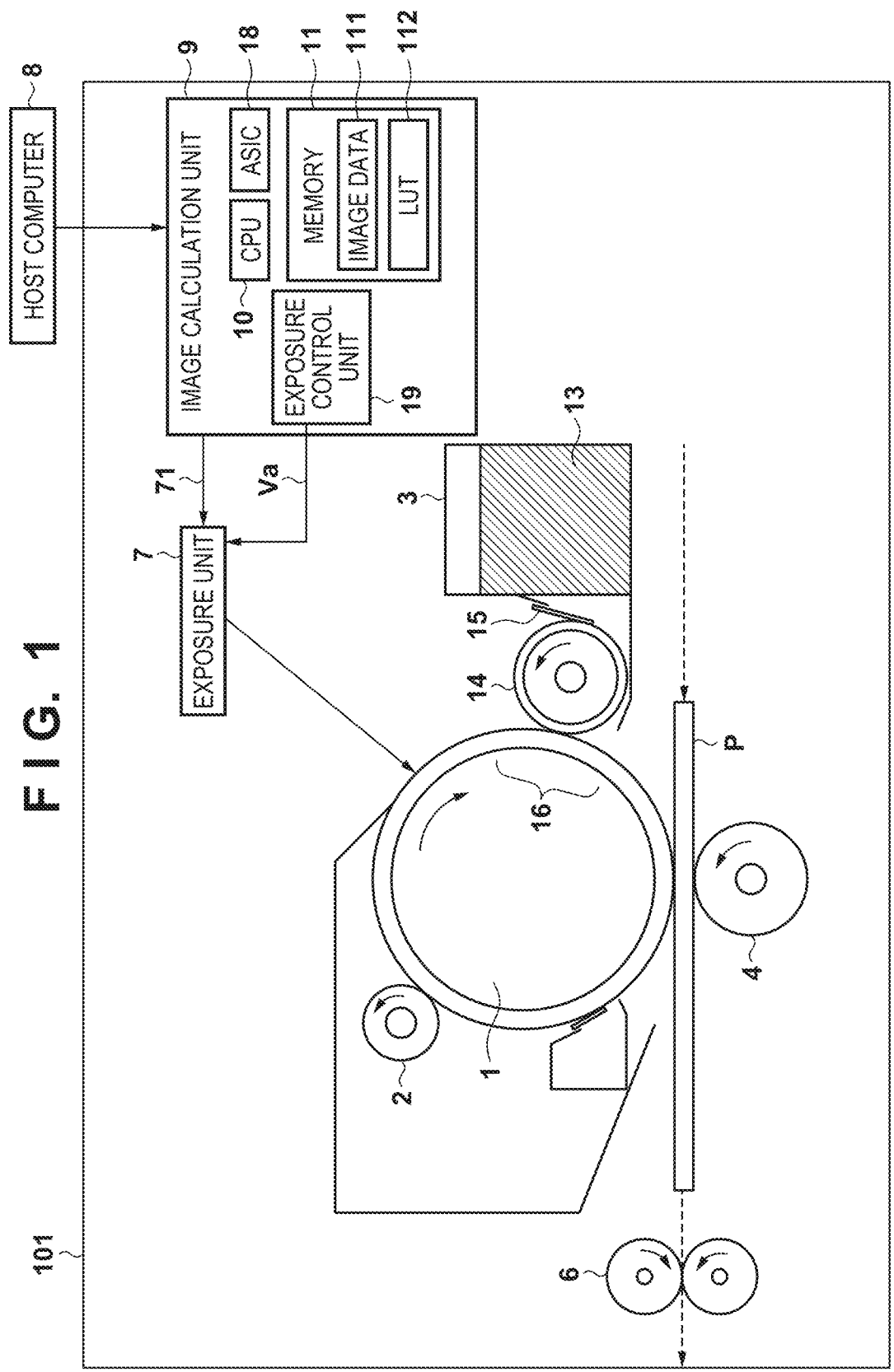

FIG. 9A

| CORRECTION WIDTH PARAMETER | CUMULATIVE NUMBER | | | | |
|---|---|---|---|---|---|
| | 0-1000 | 1001-5000 | 5001-10000 | 10001-15000 | 15001- |
| LOW TEMPERATURE/ LOW HUMIDITY | 7 | 7 | 7 | 6 | 5 |
| NORMAL TEMPERATURE/ NORMAL HUMIDITY | 7 | 7 | 7 | 7 | 6 |
| HIGH TEMPERATURE/ HIGH HUMIDITY | 7 | 7 | 7 | 7 | 6 |
| ... | | | | | |

FIG. 9B

| EXPOSURE AMOUNT ADJUSTMENT PARAMETER | CUMULATIVE NUMBER | | | | |
|---|---|---|---|---|---|
| | 0-1000 | 1001-5000 | 5001-10000 | 10001-15000 | 15001- |
| LOW TEMPERATURE/ LOW HUMIDITY | 18 | 20 | 22 | 22 | 22 |
| NORMAL TEMPERATURE/ NORMAL HUMIDITY | 20 | 22 | 25 | 24 | 23 |
| HIGH TEMPERATURE/ HIGH HUMIDITY | 22 | 25 | 26 | 25 | 25 |
| ... | | | | | |

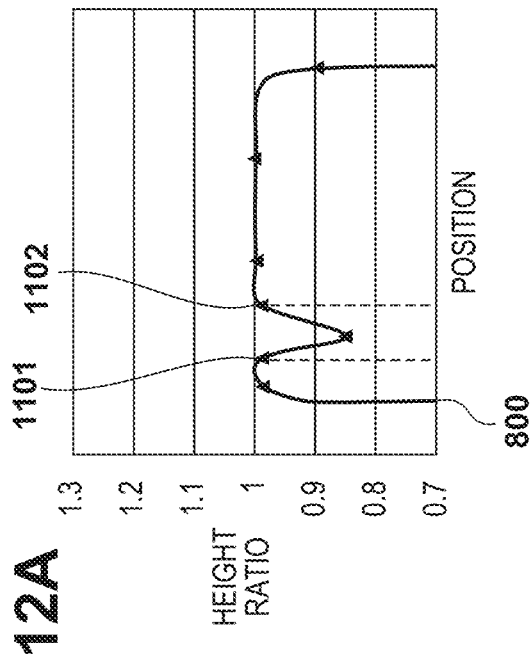
FIG. 12A
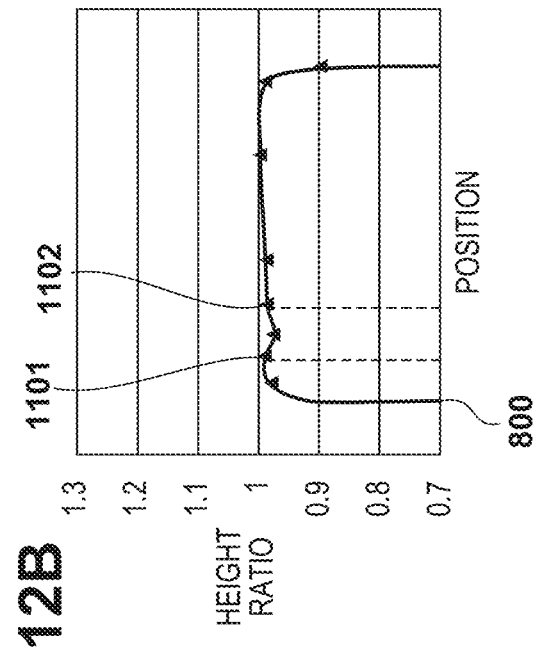
FIG. 12B
FIG. 11
| x | AE |
|---|----|
| 1 | 20 |
| 2 | 20 |
| 3 | 20 |
| 4 | 20 |
| 5 | 20 |
| 6 | 16 |
| 7 | 12 |
| 8 | 8  |
| 9 | 4  |

FIG. 15A

| - | - | - | - | - | - | - | - | - | - | - | - | - | - | - | - | - |
|---|---|---|---|---|---|---|---|---|---|---|---|---|---|---|---|---|
| - | - | - | - | - | - | - | - | - | - | - | - | - | - | - | - | - |
| - | - | - | - | - | - | - | - | - | - | - | - | - | - | - | - | - |
| - | - | - | - | - | - | - | - | - | - | - | - | - | - | - | - | - |
| - | - | - | - | - | - | - | - | - | - | - | - | - | - | - | - | - |
| - | - | - | - | - | - | - | - | - | - | - | - | - | - | - | - | - |
| - | - | - | - | - | - | - | - | - | - | - | - | - | - | - | - | - |
| - | - | - | - | - | - | - | - | - | - | - | - | - | - | - | - | - |
| 4 | 4 | 4 | 4 | 4 | 4 | 4 | 4 | 4 | 4 | 4 | 4 | 4 | 4 | 4 | 4 | 4 |
| 8 | 8 | 8 | 8 | 8 | 8 | 8 | 8 | 8 | 8 | 8 | 8 | 8 | 8 | 8 | 8 | 8 |
| 12 | 12 | 12 | 12 | 12 | 12 | 12 | 12 | 12 | 12 | 12 | 12 | 12 | 12 | 12 | 12 | 12 |
| 16 | 16 | 16 | 16 | 16 | 16 | 16 | 16 | 16 | 16 | 16 | 16 | 16 | 16 | 16 | 16 | 16 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |

FIG. 15B

| 20 | 20 | 20 | 20 | 20 | 20 | 20 | 20 | 20 | 20 | 20 | 20 | 20 | 20 | 20 | 20 | 20 |
|---|---|---|---|---|---|---|---|---|---|---|---|---|---|---|---|---|
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 16 | 16 | 16 | 16 | 16 | 16 | 16 | 16 | 16 | 20 | 20 | 20 | 20 |
| 20 | 20 | 20 | 20 | 16 | 12 | 12 | 12 | 12 | 12 | 12 | 12 | 16 | 20 | 20 | 20 | 20 |
| 20 | 20 | 20 | 20 | 16 | 12 | 8 | 8 | 8 | 8 | 8 | 12 | 16 | 20 | 20 | 20 | 20 |
| 20 | 20 | 20 | 20 | 16 | 12 | 8 | 4 | 4 | 4 | 8 | 12 | 16 | 20 | 20 | 20 | 20 |
| 20 | 20 | 20 | 20 | 16 | 12 | 8 | 4 | - | 4 | 8 | 12 | 16 | 20 | 20 | 20 | 20 |
| 20 | 20 | 20 | 20 | 16 | 12 | 8 | 4 | 4 | 4 | 8 | 12 | 16 | 20 | 20 | 20 | 20 |
| 20 | 20 | 20 | 20 | 16 | 12 | 8 | 8 | 8 | 8 | 8 | 12 | 16 | 20 | 20 | 20 | 20 |
| 20 | 20 | 20 | 20 | 16 | 12 | 12 | 12 | 12 | 12 | 12 | 12 | 16 | 20 | 20 | 20 | 20 |
| 20 | 20 | 20 | 20 | 16 | 16 | 16 | 16 | 16 | 16 | 16 | 16 | 16 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |
| 20 | 20 | 20 | 20 | 20 | 20 | 20 | 20 | 20 | 20 | 20 | 20 | 20 | 20 | 20 | 20 | 20 |

FIG. 16

| x | AE |
|---|---|
| 1 | 20 |
| 2 | 20 |
| 3 | 20 |
| 4 | 20 |
| 5 | 20 |
| 6 | 12 |
| 7 | 7 |
| 8 | 3 |
| 9 | 1 |

FIG. 17

| x | AE |
|---|---|
| 1 | 20 |
| 2 | 20 |
| 3 | 20 |
| 4 | 20 |
| 5 | 20 |
| 6 | 19 |
| 7 | 14 |
| 8 | 6 |
| 9 | 1 |

FIG. 18

| x | AE |
|---|---|
| 1 | 0 |
| 2 | 20 |
| 3 | 20 |
| 4 | 20 |
| 5 | 20 |
| 6 | 16 |
| 7 | 12 |
| 8 | 8 |
| 9 | 4 |

IMAGE FORMING APPARATUS AND IMAGE PROCESSING APPARATUS FOR DECIDING AMOUNT OF REDUCTION OF EXPOSURE AMOUNT INDICATED BY IMAGE DATA

BACKGROUND OF THE INVENTION

Field of the Invention

The present invention relates to an image forming apparatus and an image processing apparatus that bring an amount of developer adhering to an image closer to a target value.

Description of the Related Art

In an image forming apparatus, phenomena called "sweeping" and "edge effects", in which the amount of developer (hereinafter referred to as toner) adhering to an edge region of an electrostatic latent image formed on a photoconductor increases beyond a target value corresponding to a pixel value, may occur. Japanese Patent Laid-Open No. 2016-91009 discloses a configuration that suppresses the influence of sweeping and edge effects. According to Japanese Patent Laid-Open No. 2016-91009, a correction region is determined based on information indicating the distance from an edge, and an exposure amount for each of the pixels in the correction region is adjusted, thereby suppressing the influence of sweeping and edge effects. By suppressing the influence of sweeping and edge effects, it is possible to suppress an increase in the consumption of toner.

However, the regions in which the amount of adhering toner increases beyond a target value due to sweeping and edge effects (hereinafter, referred to as a toner increase region) vary depending on variations among individual image forming apparatuses. In the configuration in Japanese Patent Laid-Open No. 2016-91009, toner increase regions are assumed to be fixed and variation in the size of the toner increase region due to variation between individual image forming apparatuses is not considered, and such fixed toner increase regions are used as correction regions. Therefore, when a correction region and a toner increase region are different, the exposure amount ends up being adjusted for pixels that do not need correction, or the exposure amount ends up not being adjusted for pixels that need correction, and thus the image quality deteriorates. Further, in a case where the correction region is smaller than the toner increase region, the amount of adhering toner increases from the target value corresponding to the pixel value, and the toner consumption amount increases.

SUMMARY OF THE INVENTION

According to an aspect of the present invention, an image forming apparatus includes: a photoconductor; an exposure unit configured to, based on image data, form an electrostatic latent image on the photoconductor by exposing the photoconductor; a developing unit configured to cause a developer to adhere to the electrostatic latent image and thereby form an image of the developer on the photoconductor; a determination unit configured to determine a first correction region, the first correction region being a region which is within a range from where a distance from a first edge of a first image of the developer is a first value to a second value larger than the first value and which is included in the first image, and a second correction region, the second correction region being a region which is within a range from where a distance from the first edge is the second value to a third value larger than the second value and which is included in the first image; and a decision unit configured to, for each of a plurality of first correction target pixels included in the first correction region and a plurality of second correction target pixels included in the second correction region, decide an amount of reduction from an exposure amount according to a pixel value that the image data indicates, wherein the decision unit makes the amount of reduction of each of the plurality of first correction target pixels larger than the amount of reduction of each of the plurality of second correction target pixels.

Further features of the present invention will become apparent from the following description of exemplary embodiments with reference to the attached drawings.

BRIEF DESCRIPTION OF THE DRAWINGS

FIG. 1 is a block diagram of an image forming apparatus according to some embodiments.

FIG. 9A is a diagram illustrating an example of correction-width parameters.

FIG. 9B is a diagram illustrating an example of exposure-amount adjustment parameters.

FIG. 11 is a diagram illustrating an example of a relationship between a distance from an edge and an amount of reduction of an exposure amount.

FIGS. 12A and 12B are diagrams for explaining differences in toner height depending on whether or not the exposure amount is reduced.

FIGS. 15A and 15B are diagrams illustrating an amount of reduction of an exposure amount of pixels in images according to an embodiment.

FIG. 16 to FIG. 18 are diagrams illustrating examples of a relationship between a distance from an edge and an amount of reduction of an exposure amount.

DESCRIPTION OF THE EMBODIMENTS

Figure 2A:
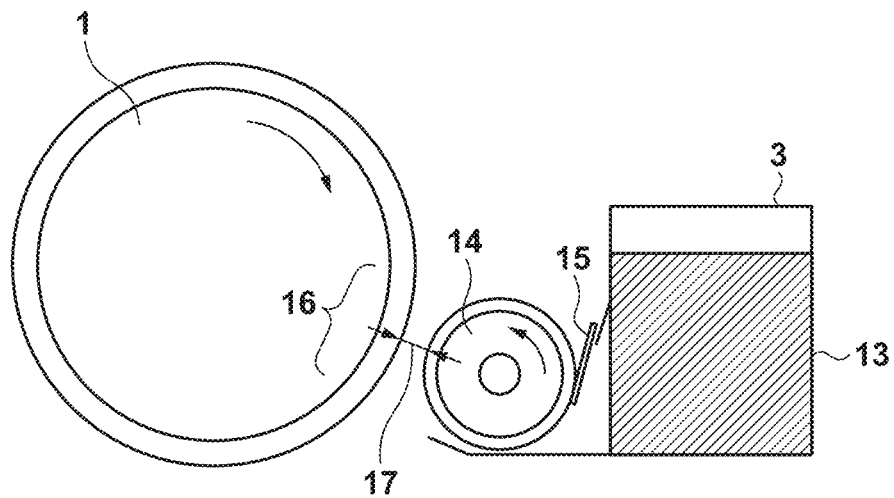
FIG. 2A and FIG. 2B are illustrations of development schemes according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus 101 according to the present embodiment. A photoconductor 1, which is an image bearing member, is rotationally driven in a direction indicated by an arrow in the figure at the time of image formation. A charging unit 2 charges the surface of the photoconductor 1 to a uniform potential. An exposure unit 7 exposes the surface of the charged photoconductor 1 with light based on image data to form an electrostatic latent image on the photoconductor 1. The exposure unit 7 is driven by a drive signal 71 output from an image calculation unit 9. An exposure control unit 19 of the image calculation unit 9 adjusts the exposure intensity of the exposure unit 7 to be the target value by a voltage Va.

A developing unit 3 includes a container 13 that stores toner, which is the developer, and a developing roller 14. The toner may be a non-magnetic mono-component toner, a two-component toner, or a magnetic toner. A regulating blade 15 is provided to regulate the thickness of the layer of toner supplied to the developing roller 14 to a predetermined value. The regulating blade 15 may be configured to impart a charge to the toner. The developing roller 14 conveys the toner to a developing region 16. Note that the developing region 16 is a region in which the developing roller 14 and the photoconductor 1 are close to or in contact with each other, and is a region in which the toner adheres to the electrostatic latent image. Toner is caused to adhere to the electrostatic latent image formed on the photoconductor 1 by the developing unit 3, and is visualized as a toner image. A transfer unit 4 transfers the toner image formed on the photoconductor 1 to a recording material P. A fixing unit 6 applies heat and pressure to the recording material P to fix the toner image transferred to the recording material P to the recording material P. Note that the photoconductor 1, the charging unit 2, and the developing unit 3 may be accommodated in a process cartridge that is detachable from the image forming apparatus 101.

A CPU 10 of the image calculation unit 9 is a control unit that comprehensively controls the entire image forming apparatus 101. Note that not only a configuration in which all of the control described below is executed by the CPU 10 but also a configuration in which some of the control is executed by an ASIC 18 can be adopted. Further, the ASIC 18 may be configured to execute all of the controls described below. A memory 11 is a holding unit that stores image data 111 and holds an LUT 112. The LUT 112 is a look-up table and includes correction information indicating one or more correction-width parameters and one or more exposure-amount adjustment parameters, which will be described later. The image calculation unit 9 receives image data transmitted from a host computer 8, and corrects the image data based on the correction information held by the LUT 112 so as to suppress the influence of edge effects and sweeping while maintaining the image quality and to not unnecessarily increase the toner consumption amount.

Figure 2B:
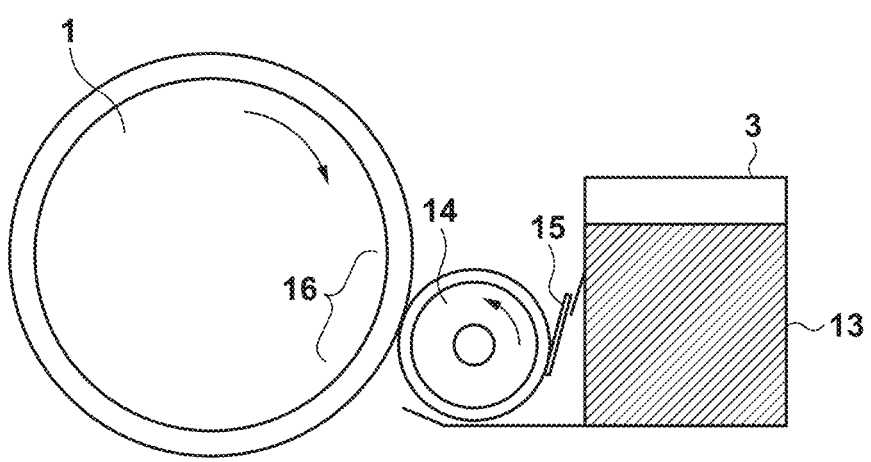

Next, development schemes in the developing unit 3 will be described with reference to FIGS. 2A and 2B. FIG. 2A illustrates a configuration of a jumping development scheme. In the jumping development scheme, rather than bringing the developing roller 14 into contact with the photoconductor 1, a gap 17 of a predetermined distance is provided. An alternating-current bias in which a direct-current bias is superimposed is used as a developing bias output by the developing roller 14. FIG. 2B illustrates a configuration of a contact development scheme. In the contact scheme, the developing roller 14 and the photoconductor 1 are brought into contact with each other. Then, a direct-current bias is used as a developing bias output by the developing roller 14.

Next, the reason why edge effects and sweeping, in which the amount of the toner adhering to the electrostatic latent image increases beyond the target value at an edge portion, occur will be described, respectively. Sweeping is a phenomenon in which toner is concentrated in a region at the rear end of the toner image in the rotation direction of the photoconductor 1. In the following description, the terms "toner image", "developer image", and "image" refer to a region where toner adheres collectively. In other words, in a case where there are a plurality of regions to which the toner adheres collectively on one recording material P, each region to which the toner adheres collectively is assumed to be an "image". In this case, a plurality of images are formed on the recording material P rather than one image.

Figure 3A:
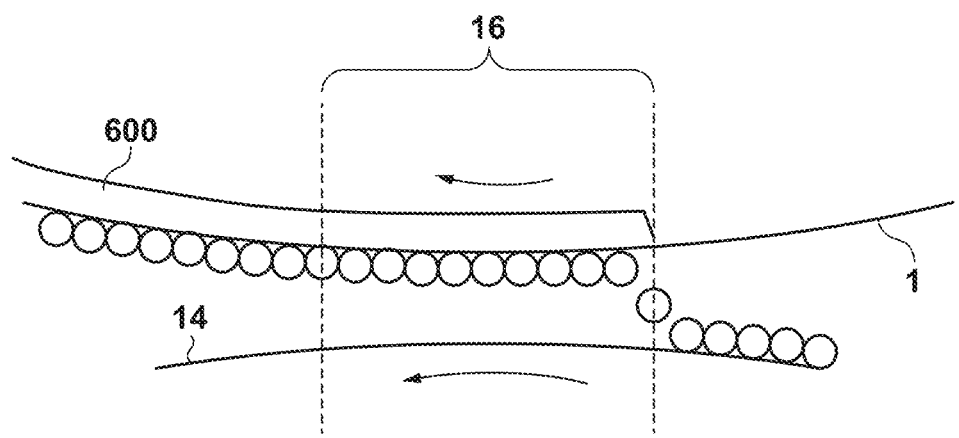
FIGS. 3A to 3C are diagrams for explaining why sweeping occurs.
Figure 3B:
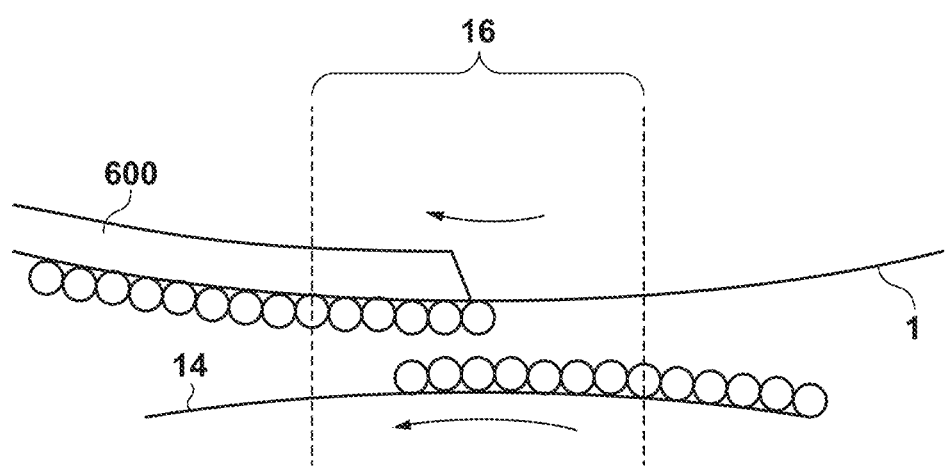
Figure 3C:
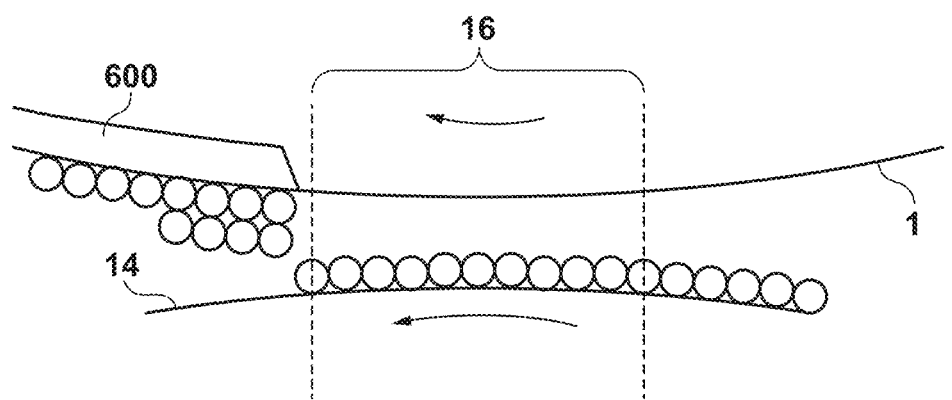

In a contact development scheme illustrated in FIG. 2B, the circumferential speed of the developing roller 14 is made to be faster than the circumferential speed of the photoconductor 1 in order to set the thickness of the toner of the photoconductor 1 to a predetermined value. As illustrated in FIGS. 3A to 3C, in the developing region 16, the electrostatic latent image is developed by the toner conveyed by the developing roller 14. Note that, in FIGS. 3A to 3C, the toner is indicated by circles. Since the developing roller 14 rotates at a speed higher than that of the photoconductor 1, the positional relationship between the two surfaces is constantly shifting. As illustrated in FIG. 3A, when the rear end of an electrostatic latent image 600 enters the developing region 16, the toner on the developing roller 14 is positioned behind the starting position of the developing region 16 in the rotation direction. However, since the rotational speed of the developing roller 14 is higher than the rotational speed of the photoconductor 1, as illustrated in FIG. 3B, the toner of the developing roller 14 overtakes the rear end of the electrostatic latent image 600 before the rear end of the electrostatic latent image 600 passes through the developing region 16. As illustrated in FIG. 3C, the toner of the developing roller 14 is supplied to the rear end of the electrostatic latent image 600, so that the amount of toner adhering to the rear end of the electrostatic latent image increases. This is the mechanism behind the occurrence of sweeping.

Figure 4A:
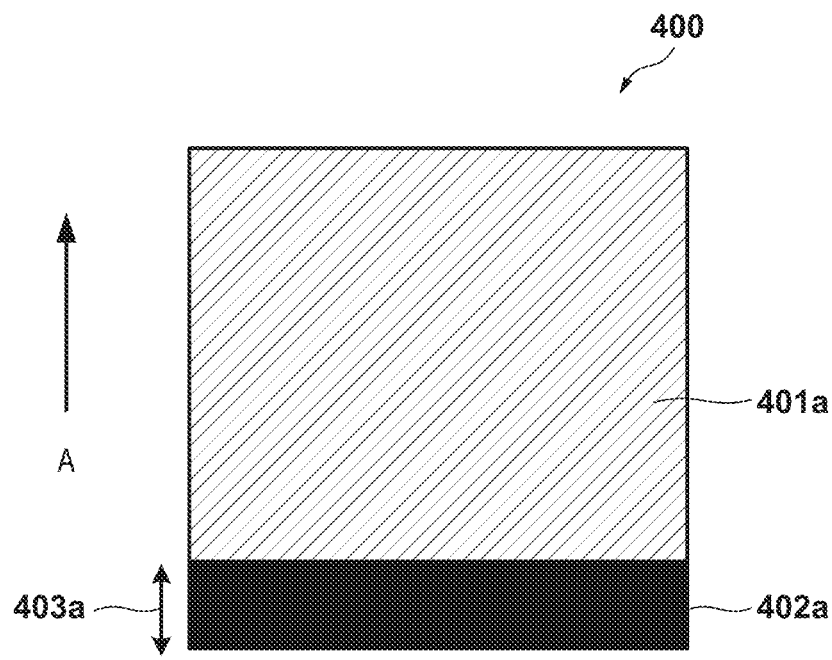
FIG. 4A is a diagram illustrating an image in which sweeping has occurred.

FIG. 4A illustrates a toner image 400 in which sweeping has occurred. An arrow A in FIG. 4A indicates a conveyance direction of the toner image, that is, a rotation direction of the photoconductor 1. The rotation direction of the photoconductor 1 is also referred to as a sub-scanning direction. It should be noted that all the pixel values of the original image data of the toner image 400 are the same, that is, the toner image 400 is an image having a uniform density. When sweeping occurs, the adherence of toner concentrates on a trailing end region 402*a* of the toner image 400. Consequently, the density of the trailing end region 402*a* illustrated in black is higher than the density of the other region 401*a*. Therefore, the trailing end region 402*a* is a toner increase region in which the amount of adhered toner increases beyond the target value corresponding to the pixel value, and is also expressed as the toner increase region 402*a* in the following explanation. Further, in the following explanation, the region 401*a* in which the amount of adhered toner does not increase is also referred to as a non-toner increase region 401*a*.

The density of the toner increase region 402*a* varies depending on the operating environment of the image forming apparatus 101, the cumulative number of sheets of the recording material P on which an image has been formed using the process cartridge, and the like. Further, a length 403*a* of the toner increase region 402*a* in the sub-scanning direction (hereinafter, also referred to as the toner increase region length 403*a*) varies depending on the ratio of the circumferential speeds of the photoconductor 1 and the developing roller 14 and the length of the developing region 16 in the sub-scanning direction, in addition to the operating environment and the cumulative sheet count.

The length of the developing region 16 in the sub-scanning direction may be different for each individual process cartridge and image forming apparatus 101. Therefore, the toner increase region length 403*a* may also be different for each individual image forming apparatus 101.

Figure 5:
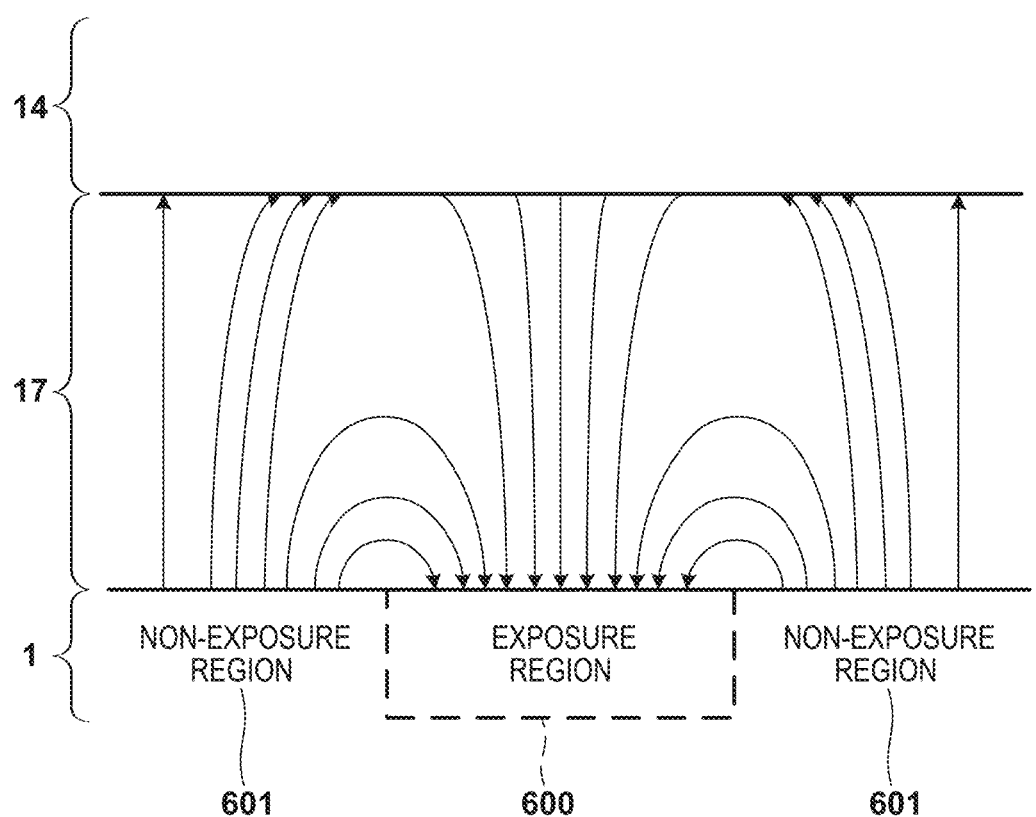
FIG. 5 is a diagram for explaining why edge effects occur.

Meanwhile, edge effects are a phenomenon in which an electric field concentrates on the boundary between an electrostatic latent image formed on the photoconductor 1, that is, the exposure region and the non-exposure region, such that the toner excessively adheres to each edge of the electrostatic latent image. For example, assume that an image to be formed has a uniform density. As illustrated in FIG. 5, lines of electric force from a non-exposure region 601 around the exposure region 600 wrap around the edge of the exposure region 600, and the electric field intensity at the edge becomes stronger than in other regions of the exposure region 600. Therefore, more toner adheres to the edge of the exposure region 600 than to the other regions.

Figure 4B:
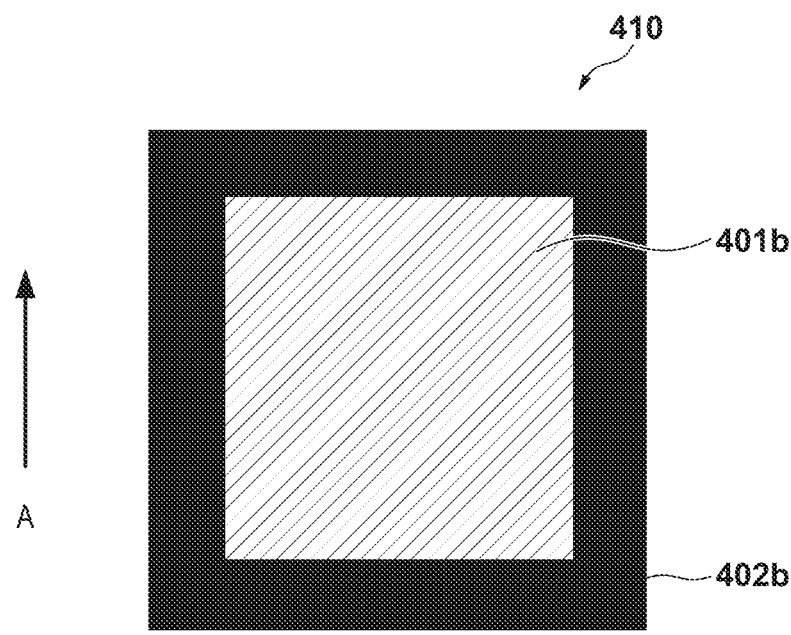
FIG. 4B is a diagram illustrating an image in which edge effects have occurred.

FIG. 4B illustrates a toner image 410 in which edge effects have occurred. Arrow A in FIG. 4B indicates the sub-scanning direction. It should be noted that all the pixel values of the original image data of the toner image 410 are the same, that is, the toner image 410 is an image having a uniform density. When edge effects occur, the adherence of toner concentrates on an edge region 402*b* of the entire toner image 410. Consequently, the density of the edge region 402*b* is higher than the density of a non-edge region 401*b*. Note that edge effects mainly occur in a jumping development scheme in which there is a gap between the photoconductor 1 and the developing roller 14. As in the case of sweeping, hereinafter, the edge region 402*b* will also be expressed as a toner increase region 402*b*, and the non-edge region 401*b* will also be referred to as a non-toner increase region 401*b*.

The width of the toner increase region 402*b* surrounding the toner image 410 increases as the field strength at the edge increases. The electric field intensity at the edge varies depending on the size of the gap 17 between the photoconductor 1 and the developing roller 14. The size of the gap 17 may be different for each individual process cartridge and image forming apparatus 101. Therefore, as in the case of sweeping, the width of the toner increase region 401*b* may be different for each individual image forming apparatus 101.

Figure 6:
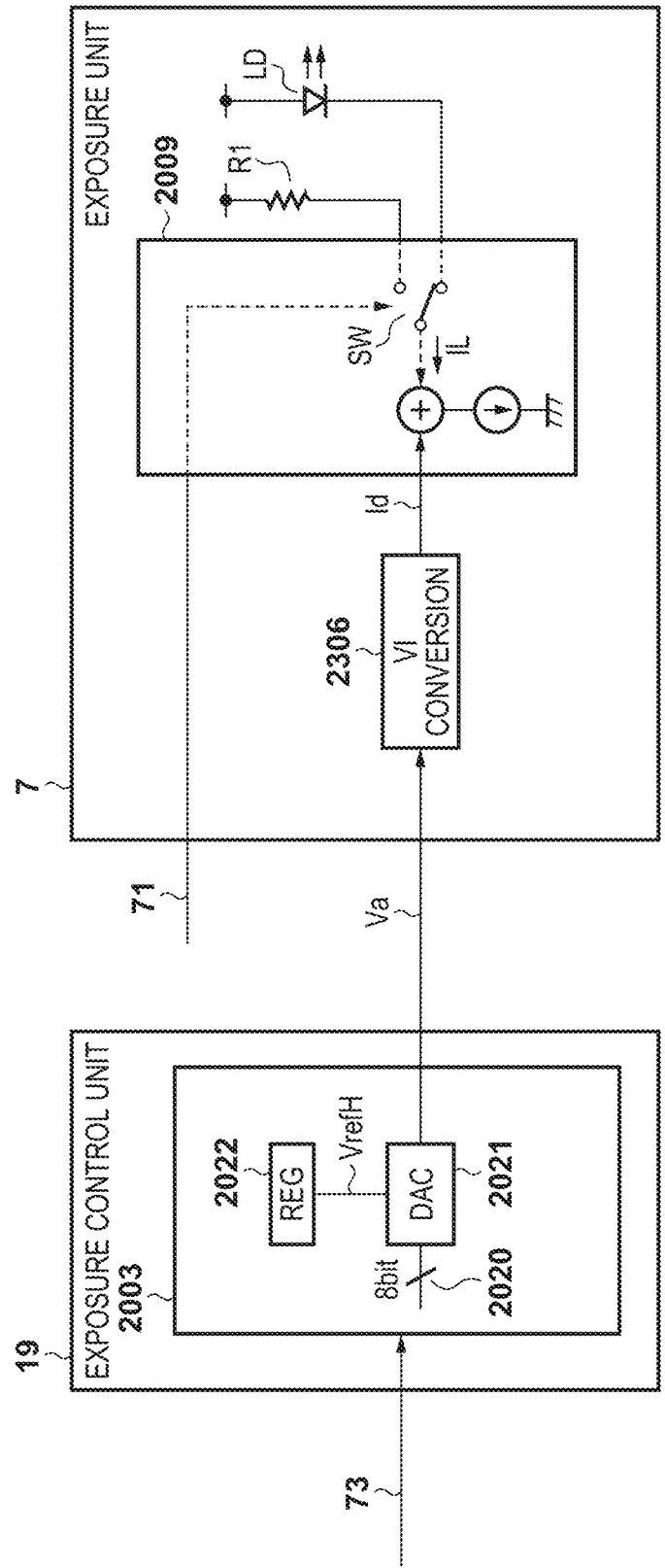
FIG. 6 is a diagram illustrating a configuration for controlling an exposure amount according to some embodiments.

FIG. 6 is a control configuration of the exposure unit 7. The exposure control unit 19 includes an IC 2003 including an 8-bit DA converter (DAC) 2021 and a regulator (REG) 2022. The IC 2003 adjusts a voltage VrefH outputted by the regulator 2022 based on an intensity adjustment signal 73 set by the CPU 10. The voltage VrefH is the reference voltage of the DA converter 2021. When the IC 2003 sets the input data 2020 of the DA converter 2021, the DA converter 2021 outputs the voltage Va to the exposure unit 7. A VI conversion circuit 2306 of the exposure unit 7 converts the voltage Va into a current value Id and outputs it to a driver IC 2009. The driver IC 2009, controls the emission intensity of LD, that is, the exposure intensity of the exposure unit 7, by controlling the magnitude of the current IL flowing through the laser diode (LD) of the exposure unit 7 by the current value Id. In this manner, the exposure control unit 19 can control the exposure intensity of the exposure unit 7 by the voltage Va. The driver IC 2009 switches a switch (SW) of the driver IC 2009 according to the drive signal 71 outputted by the image calculation unit 9. The SW switches whether the current IL flows to LD of the exposure unit 7 or flows to a dummy resistor RI to control whether the light emission of LD is on or off.

Figure 7A:
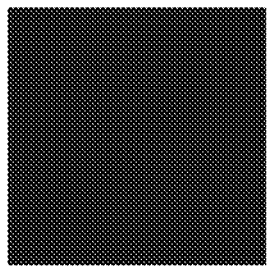
FIGS. 7A to 7C are diagrams for explaining a method of controlling an exposure amount according to some embodiments.
Figure 7B:
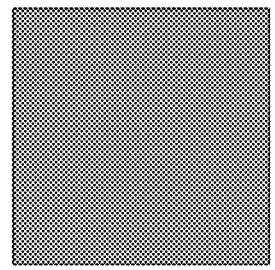
Figure 7C:
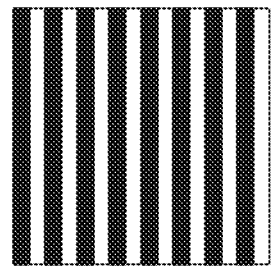

Next, a method of controlling the exposure amount of a pixel will be described. FIG. 7A illustrates a state in which all regions of a pixel are exposed to an intensity of 100% for a given target intensity. In addition, FIG. 7B and FIG. 7C illustrate pixels of approximately half the density of the pixels in FIG. 7A. The pixel of FIG. 7B is formed by exposing all regions of the pixel at an intensity of 50% of a given target intensity. As described with reference to FIG. 6, the exposure intensity is controlled by the voltage Va outputted by the exposure control unit 19 to the exposure unit 7. In FIG. 7C, one pixel is divided into N sub-pixels (N is a natural number that is 2 or higher), and is formed by exposing every other sub-pixel at an intensity of 100% with respect to the target intensity. This is realized by setting the voltage Va so that the exposure intensity is the target intensity and turning on and off the SW with the drive signal 71 in the control configuration of FIG. 6. In this case, the drive signal 71 is a pulse width modulation (PWM) signal. The exposure amount of the pixels in FIG. 7B and FIG. 7C is ½ of the exposure amount of the pixel in FIG. 7A. In this manner, the exposure amount of the pixel can be controlled by the exposure intensity of the pixel, the exposure amount of the pixel, or a combination thereof.

Figure 8A:
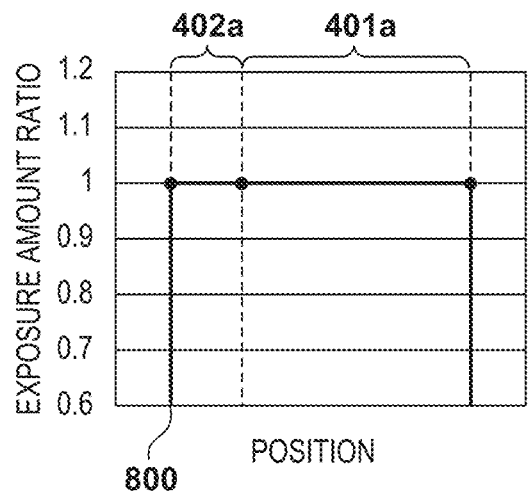
FIG. 8A is a diagram illustrating an exemplary relationship between a position on a photoconductor and an exposure amount.
Figure 8B:
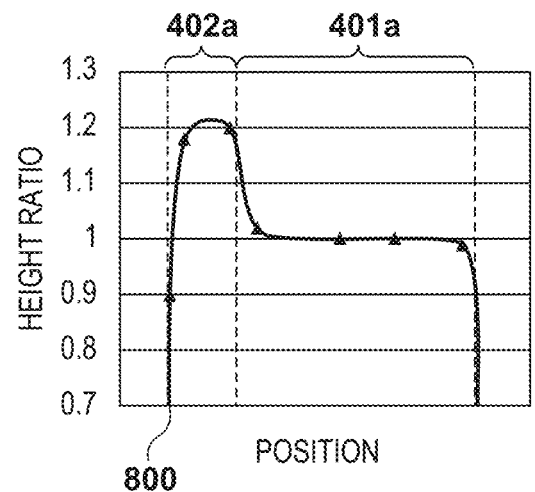
FIG. 8B is a diagram illustrating an exemplary relationship between a position on a photoconductor and a height of adhered toner.

FIG. 8A illustrates a state in which each pixel of the toner image 400 (FIG. 4A) is exposed at an exposure amount corresponding to a pixel value in order to form the toner image 400 on the photoconductor 1. Note that the pixel values of the pixels of the toner image 400 are the same. In each of FIG. 8A to FIG. 8D, the horizontal axis indicates the position in the sub-scanning direction, and a position 800 corresponds to the edge on the rear end side of the electrostatic latent image (or toner image). The "exposure amount ratio" on the vertical axis of FIG. 8A is a relative value for the sake of descriptive convenience, and the exposure amount in FIG. 8A is assumed to be the value "1". FIG. 8B illustrates a relationship between the position in the sub-scanning direction and the height of the toner of the toner image 400 formed when exposed as in FIG. 8A. Note that the "height ratio" in FIG. 8B is the value "1" when the height of the toner is a target value. Since the density increases as the height of the adhering toner increases, the vertical axis in FIG. 8B can also be read as the density. As illustrated in FIG. 8B, sweeping causes a toner increase region 402a in which the toner height is greater than 1.

Figure 8C:
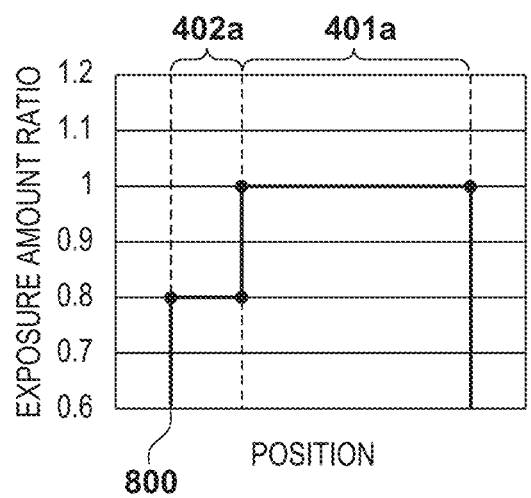
FIG. 8C is a diagram illustrating an exemplary relationship between a position on a photoconductor and an exposure amount.
Figure 8D:
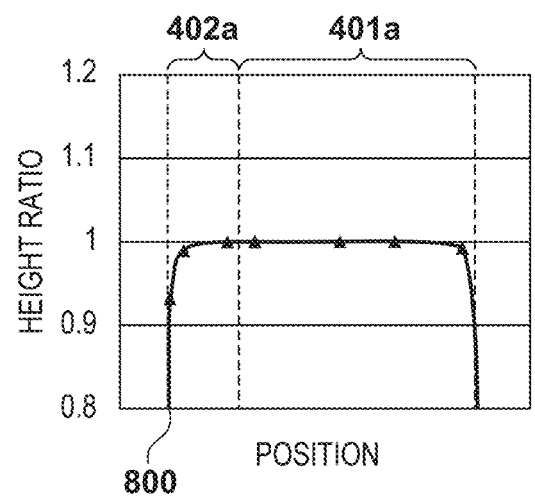
FIG. 8D is a diagram illustrating an exemplary relationship between a position on a photoconductor and a height of adhered toner.

FIG. 8C illustrates a case where the exposure amount ratio in the toner increase region 402a is smaller than that in FIG. 8B. FIG. 8D illustrates a relationship between the position in the sub-scanning direction and the height of the toner of the toner image 400 formed when exposed as in FIG. 8C. As illustrated in FIG. 8D, by decreasing the exposure amount of the toner increase region 402a, it is possible to cancel out the amount of increase in toner adhering to the toner increase region 402a due to sweeping, and to make the height of the toner substantially fixed.

In order to decide the toner increase region length 403a and the adjustment amount (reduction amount) of the exposure amount, in the present embodiment, correction information including the correction-width parameters and the exposure-amount adjustment parameters is stored in the memory 11. FIG. 9A illustrates an example of a correction-width parameter, and FIG. 9B illustrates an example of an exposure-amount adjustment parameter. As described above, the increase region length 403a and the density variation (variation in the height of the toner) vary depending on the operating environment and the cumulative number of recording materials P on which images have been formed. Therefore, as illustrated in FIGS. 9A and 9B, a correction-width parameter and an exposure-amount adjustment parameter associated with each combination of the operation environment and the cumulative number of sheets (hereinafter, a combination of the operating environment and the cumulative number of sheets is referred to as the "state" of the image forming apparatus) is provided.

In FIGS. 9A and 9B, the operating environment is defined as a combination of temperature and humidity. Each of low temperature, normal temperature, and high temperature ranges are defined in advance. Similarly, each of low humidity, normal humidity, and high humidity ranges are defined in advance.

In FIG. 9A, the correction-width parameter indicates the toner increase region length 403a as a reference in terms of the number of pixels. In addition, in FIG. 9B, the exposure-amount adjustment parameter indicates a rate at which the exposure amount is decreased as a percentage. In the following, the increase region length 403a as the reference indicated by the correction-width parameter is referred to as "reference length". In the following, the exposure amount decrease ratio indicated by the exposure-amount adjustment parameter is referred to as a "reference reduction amount". The correction-width parameter and the exposure-amount adjustment parameter used in each state are obtained by experiment or simulation.

Figure 10A:
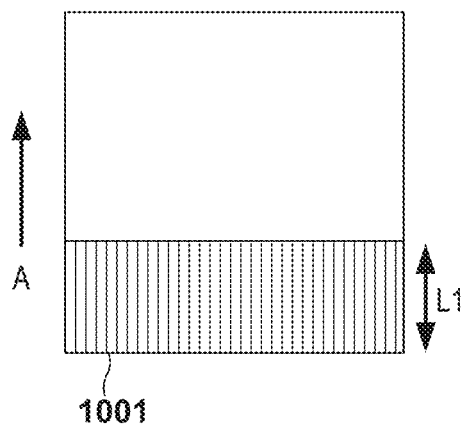
FIGS. 10A to 10E are explanatory diagrams of the influence in the case where the size of a toner increase region and a correction region are different.
Figure 10B:
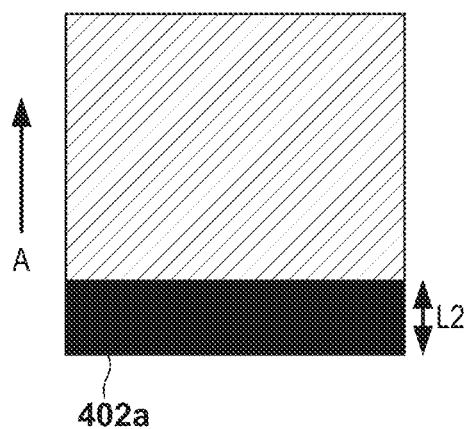
Figure 10C:
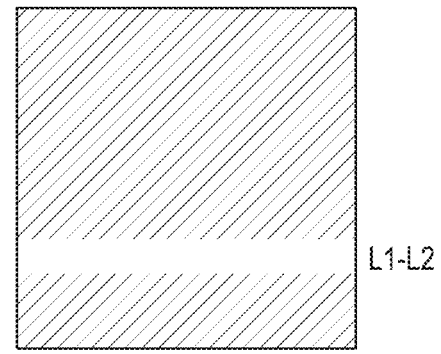
Figure 10D:
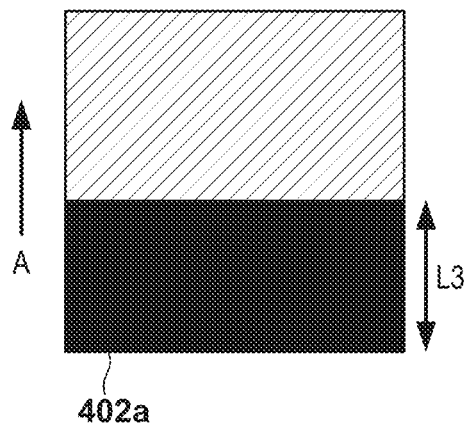

The shaded region in FIG. 10A indicates a correction region 1001 when the correction-width parameter indicates the value "L1". Note that the arrow A in FIGS. 10A to 10E indicates the sub-scanning direction. As described above, the toner increase region length 403a may also be different for each individual image forming apparatus 101. The black regions of FIG. 10B and FIG. 10D illustrate the actual toner increase region 402a. FIG. 10B illustrates that the toner increase region length 403a is L2, which is shorter than L1. Here, the correction region 1001 includes a region other than the toner increase region 402a. Therefore, the exposure amount for the pixels in regions other than the toner increase region 402a in the correction region 1001, which are illustrated in white in FIG. 10C, is unnecessarily decreased, and the density is reduced. Note that the length of the white region in FIG. 10C in the sub-scanning direction is L1-L2.

Figure 10E:
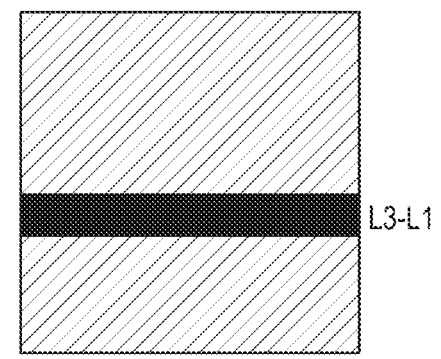

FIG. 10D illustrates that the toner increase region length 403a is L3, which is longer than the length L1 of the correction region 1001 in the sub-scanning direction. Here, some regions in the toner increase region 402a are not included in the correction region 1001. Therefore, the exposure amount for pixels in a region not included in the correction region 1001 in the toner increase region 1004 indicated by black in FIG. 10E is not adjusted, and the density of the region is higher than the target value. Note that the length of the black region in FIG. 10E in the sub-scanning direction is L3-L1.

In order to cope with individual variations in the toner increase region length 403a of the image forming apparatus 101, in the present embodiment, a "maximum variation value" of the toner increase region length 403a with respect to the correction-width parameter is also stored in advance in the memory 11 in the form of the LUT 112 as correction information. Note that the maximum variation value may be a different value for each "state" of the image forming apparatus as in the case of the correction-width parameter or the like, or may be a common value for all "states". The maximum variation value is also obtained by experimentation and simulation.

Hereinafter, a method of deciding the length of the correction region in the sub-scanning direction and the exposure amount adjustment amount for each correction target pixel in the correction region based on correction information including the correction-width parameter, the exposure-amount adjustment parameter, and the maximum variation value will be described. In the following, it is assumed that the reference length indicated by the correction-width parameter is RL, the reference reduction amount indicated by the exposure-amount adjustment parameter is RE, and the maximum variation value is a.

The CPU 10 obtains the length (pixel count) AL (corresponding to L1 in FIG. 10A) of the correction region 1001 in the sub-scanning direction by the following Expression (1).

$$AL = RL + \alpha \tag{1}$$

In the present embodiment, the CPU 10 sets the region from a rear edge of the toner image to the AL-th pixel as the correction region. Further, in the present embodiment, the CPU 10 divides the correction region into a first correction region and a second correction region. In the present embodiment, the first correction region is a region within a range from the first pixel (that is, the pixel at the rear edge) to the $(RL-\alpha)$-th pixel from the rear edge of the toner image and within the toner image. The second correction region is a region within a range from the $(RL-\alpha+1)$-th pixel to the $(RL+\alpha)$-th pixel from the rear edge of the toner image and within the toner image.

The CPU 10 obtains the exposure amount adjustment amount (reduction amount) AE for the first correction target pixel in the first correction region by the following Expression (2).

$$AE = RE \tag{2}$$

Meanwhile, the CPU 10 obtains the exposure amount adjustment amount (reduction amount) AE for the second correction target pixel in the second correction region by the following Expression (3).

$$AE = RE \times [1 - (x - (RL - \alpha))/(2\alpha + 1)] \tag{3}$$

FIG. 11 illustrates the relationship between x and the adjustment amount AE when the reference length RL=7, the reference reduction amount RE=20, and the maximum variation value α=2. Since RL+α=9, pixels where x=10 or more are pixels outside the correction region, and the exposure amount is not adjusted therefor. As illustrated in FIG. 11, the adjustment amount AE of the exposure amount of the first correction target pixel where x is 1 to RL−α=5 remains at the reference reduction amount RE=20 according to Expression (2). On the other hand, for the second correction target pixel where x exceeds RL−α=5, as illustrated in Equation (3), the adjustment amount AE is linearly decreased in accordance with the increase of x so that the adjustment amount AE becomes 0 when x is RL+α+1=10.

Similarly to FIG. 8B, FIG. 12A illustrates the relationship between the position in the sub-scanning direction and the height of the toner in the toner image. Note that, as illustrated in FIG. 10B, FIG. 12A illustrates that the length L2 of the toner increase region 402a in the sub-scanning direction is shorter than the length L1 of the correction region 1001 in the sub-scanning direction by the maximum variation value α. For example, if L1=RL=7 and α=2, then L2=5. Note that the position x of the reference numeral 1101 in FIG. 12A is 5, and the position x of the reference numeral 1102 is 8. As described in FIG. 8B and FIG. 8C, if the exposure amount of all the pixels in the correction region 1001 is reduced by RE=20, the exposure amount is unnecessarily reduced at x=6 and 7, and thus the height of the toner is also reduced.

Meanwhile, in the present embodiment, as illustrated in FIG. 11, up to x=5, the pixel exposure amount is reduced by RE=20 as in FIG. 12A, but the adjustment amount RE of the exposure amount is gradually decreased in the range of x=6 to 9. That is, the adjusted exposure amount is higher than in the case of FIG. 12A. Therefore, as illustrated in FIG. 12B, it is possible to avoid a sudden change in the height of the toner, suppress a steep change in the density, and reduce the density difference with respect to the target density. In addition, by suppressing a steep change in density, it is possible to make a density difference difficult to see. Further, even if the toner increase region length 403a varies by the maximum variation value α, since the exposure amount of all the pixels in the toner increase region 402a is adjusted, it is possible to reduce the difference from the target density and suppress an increase in the amount of toner consumed.

Figure 13:
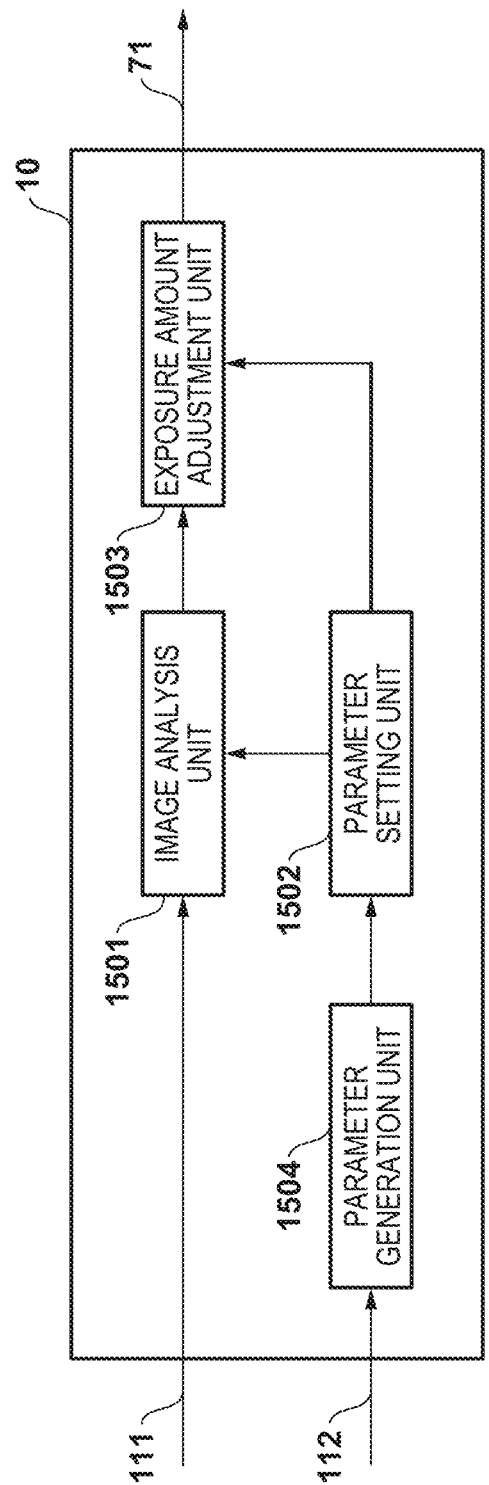
FIG. 13 is a functional block diagram of a CPU for controlling the exposure amount according to some embodiments.

FIG. 13 illustrates a functional block diagram for explaining processing in the CPU 10 for suppressing sweeping. Note that, in the present embodiment, the CPU 10 performs the sweeping suppression processing, but as already described above, configuration may be taken where the processing is performed together with the ASIC 18 or the processing performed only by the ASIC 18. A parameter generation unit 1504 manages the cumulative number of recording materials P on which an image has been formed. Further, the parameter generation unit 1504 acquires operation environment information of the image forming apparatus 101 by a sensor (not illustrated). The parameter generation unit 1504 selects the cumulative number of sheets and operation environment information, that is, the correction-width parameter and the exposure-amount adjustment parameter corresponding to the "state" of the image forming apparatus, from the correction information indicated by the LUT 112. Note that the correction information also indicates the maximum variation value α, and the parameter generation unit 1504 also acquires the maximum variation value α from the correction information. As described above, the maximum variation value α may be a value corresponding to the state of the image forming apparatus similarly to the correction-width parameter and the exposure-amount adjustment parameter, or may be a fixed value regardless of the state. The parameter generation unit 1504 determines the length (the number of pixels) AL of the correction region 1001 in the sub-scanning direction and the adjustment amount AE based on the correction-width parameter, the exposure-amount adjustment parameter, and the maximum variation value α. A parameter setting unit 1502 notifies and sets the length AL to an image analysis unit 1501. The parameter setting unit 1502 notifies and sets the adjustment amount AE to an exposure amount adjustment unit 1503.

The image data 111 transmitted from the host computer 8 is stored in the memory 11 illustrated in FIG. 1. The image analysis unit 1501 specifies a pixel in the length AL from the rear edge in the sub-scanning direction among the pixels of the image formed by the image data 111, and notifies the exposure amount adjustment unit 1503 of the specified pixel. The exposure amount adjustment unit 1503 corrects the pixel value of the pixel specified by the image analysis unit 1501 based on the adjustment amount AE to generate the drive signal 71. The exposure unit 7 is driven by the drive signal 71.

Figure 14:
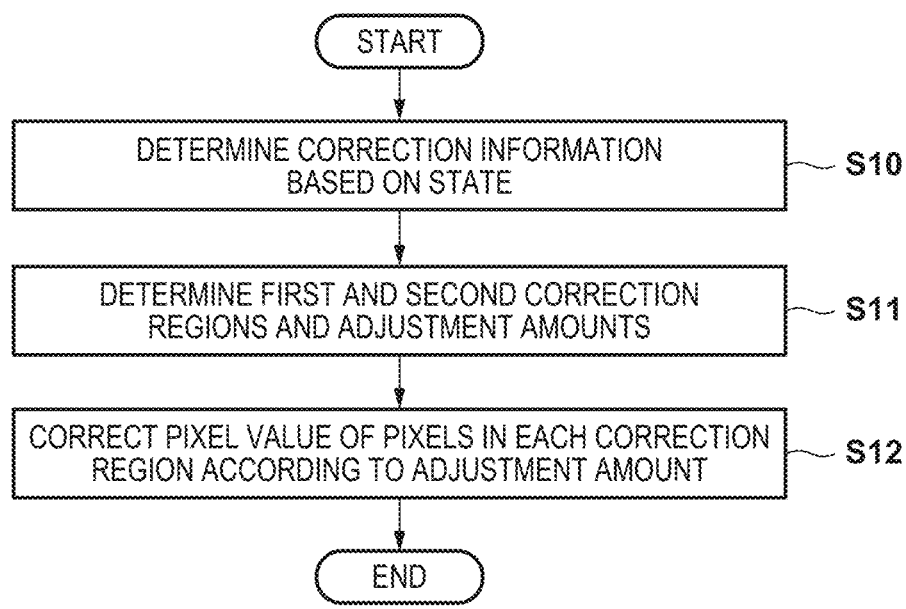
FIG. 14 is a flowchart of an exposure amount adjustment process according to some embodiments.

FIG. 14 is a flowchart of an exposure amount adjustment process executed when the CPU 10 forms images. In FIG. 14, the maximum variation value α is also set to a value corresponding to the state of the image forming apparatus similarly to the correction-width parameter and the exposure-amount adjustment parameter. Therefore, the memory 11 stores correction information indicating the correction-width parameter, the exposure-amount adjustment parameter, and the maximum variation value α associated with each state of the image forming apparatus. The CPU 10 determines the state at the time of image formation in step S10, and reads out correction information corresponding to the determined state from the memory 11. In step S11, the CPU 10 determines the first correction region and the second correction region based on the correction information. Then, the CPU 10 obtains an exposure amount adjustment amount AE for each of the plurality of first correction target pixels included in the first correction region and the plurality of second correction target pixels included in the second correction region. In step S12, the CPU 10 corrects the pixel values of the respective pixels based on the adjustment amount AE of the exposure amount of the respective correction target pixels in the first correction region and the second correction region.

FIG. 15A illustrates an image of 17×17 pixels (total of 289 pixels) to which toner is adhered based on the image data 111. Note that the pixel values of the 289 pixels illustrated in FIG. 15A are values other than 0, for example, 255, which indicates a maximum density. The value of the other pixels of the image data 111 is, for example, 0. Further, it is assumed that the direction from the bottom toward the top of FIG. 15A is the sub-scanning direction. Therefore, the pixels in the lowermost row of FIG. 15A are pixels at the trailing edge. Pixels in which a number is written in FIG. 15A are pixels in the correction region 1001, and pixels in which a "-" is written are pixels in a non-correction region. In FIG. 15A, the reference length RL=6, the reference reduction amount RE=20, and the maximum variation value α=2. Therefore, the adjustment amount AE of the four pixels in the sub-scanning direction from the rear end side is 20, and thereafter, the adjustment amount AE decreases by 4 each pixel.

The processing for suppressing the influence of edge effects is essentially similar to that for sweeping. However, the correction region in the case of edge effects includes not only the trailing edge but also pixels whose distance from all of the edges is within RL+α. For edge effects, the value "x" used to calculate the adjustment amount AE uses the shortest distance to the edge. Therefore, the correction region 1001 for edge effects and the adjustment amount AE of each pixel in the correction region 1001 is as in FIG. 15B.

As described above, based on the reference length RL indicated by the correction-width parameter and the maximum variation value α, the correction region, and the first correction region and second correction region obtained by dividing the correction region are determined. Specifically, the range in the distance from the rear edge to the pixel count (RL−α) is the first correction region, and the range from (RL−α+1) to (RL+α) is the second correction region. The adjustment amount AE of the exposure amount of the first correction target pixel in the first correction region is set as the reference reduction amount RE indicated by the exposure-amount adjustment parameter. On the other hand, for the second correction target pixel in the second correction region, the adjustment amount AE is made to decrease linearly as the distance increases. As an example, in Equation (3), the adjustment amount AE is made to decrease linearly so that the adjustment amount AE of the (RL+α+1)-th pixel from the edge becomes 0. With this configuration, it is possible to adjust the exposure amount of pixels in the first correction region in which the toner is estimated to adhere excessively, at all times, due to the sweeping or edge effect, thereby suppressing deterioration in image quality and suppressing an increase in the toner consumption amount. In addition, for the pixels in the second correction region in which the amount of adhered toner may vary in each individual image forming apparatus 101, the adjustment amount AE of the exposure amount is decreased from the adjustment amount AE of the pixels in the first correction region. As a result, it is possible to suppress a steep change in the exposure amount in the second correction region and suppress a decrease in image quality. Accordingly, it is possible to suppress an increase in the toner consumption amount while suppressing deterioration in image quality.

Second Embodiment

Next, a second embodiment will be described with a focus on differences from the first embodiment. In the first embodiment, as illustrated in Expression (3), in the second correction region, the adjustment amount AE is linearly decreased with increasing x. In the present embodiment, the adjustment amount AE is made smaller than that in the first embodiment in order to further prevent deterioration in image quality due to excessive correction of the exposure amount.

The difference from the first embodiment is that Equation (3) of the first embodiment is changed to Equation (4) below. In Equation (3), in the second correction region, the adjustment amount AE was decreased in a first order function, that is, in a linear manner. In the present embodiment, as illustrated in Expression (4), in the second correction region, the adjustment amount AE is decreased according to a quadratic function. The first correction region is similar to that of the first embodiment.

$$AE=(RE+F)/(2\alpha+1)^2 \times \{x-(RL+\alpha+1)\}^2 \quad (4)$$

Here, F is a coefficient for adjusting the degree of change in the adjustment amount. The coefficient F is a negative value, and the larger the absolute value, the greater the degree of change in the adjustment amount.

FIG. 16 illustrates the relationship between x and the adjustment amount AE when the reference length RL=7, the reference reduction amount RE=20, the maximum variation value α=2, and the coefficient F=−0.5. As illustrated in FIG. 16, the adjustment amount AE of the exposure amount of the first correction region where x is 1 to RL−α=5 remains at the reference reduction amount RE=20, as in the first embodiment. Meanwhile, in the second correction region where x is larger than RL−α=5, the adjustment amount AE is decreased quadratically so that the adjustment amount AE becomes 0 when x is RL+α+1=10.

In the first embodiment, when x is increased by 1 in the second correction region, the adjustment amount AE is decreased by 4. In the present embodiment, the amount of change of the adjustment amount AE in accordance with the increase in x is decreased together with the increase in x. Specifically, in FIG. 16, the amount of change in the adjustment amount AE from x=5 to x=6 is 8, and the amount of change in the adjustment amount AE from x=6 to x=7 is 5. Further, the amount of change in the adjustment amount AE from x=7 to x=8 is 4, the amount of change in the adjustment amount AE from x=8 to x=9 is 2, and the amount of change in the adjustment amount AE from x=9 to x=10 is 1. By changing the adjustment amount in this manner, the adjustment amount AE at x=6 to 9 is made smaller than that in the first embodiment illustrated in FIG. 11. Therefore, when the toner increase region length 403a is smaller than the length of the correction region 1101 in the sub-scanning direction, it is possible to prevent the exposure amount of the non-toner increase region from being excessively corrected to reduce the density. As a result, it is possible to suppress deterioration in image quality.

Third Embodiment

Next, a third embodiment will be described with a focus on differences from the first embodiment and the second embodiment. In the present embodiment, the second correction region is different in that the following Expression (5) is used instead of Expression (3) of the first embodiment and Expression (4) of the second embodiment. The first correction region is similar to that of the first embodiment and the second embodiment.

$$AE=RE \times [1-1/(1+e^{-q})]$$

$$q=(G+4/\alpha) \times (x-RL-0.5) \quad (5)$$

Here, G is a coefficient for adjusting the degree of change in the adjustment amount. The coefficient G is greater than −2. When G is larger than 0, as the value of G increases, the amount of change in the adjustment amount AE in the vicinity of x=(RL−α) and (RL+α) increases, and the amount of change in the adjustment amount AE where x is a value in the vicinity of the center of (RL−α) and (RL+α) decreases. Meanwhile, when G is smaller than 0, the amount of change in the adjustment amount AE where x is in the vicinity of the center of x (RL−α) and (RL+α) increases as the value of G decreases.

FIG. 17 illustrates the relationship between x and the adjustment amount AE when the reference length RL=7, the reference reduction amount RE=20, the maximum variation value α=2, and the coefficient G=−0.25. As illustrated in FIG. 17, the adjustment amount AE of the first correction region remains at the reference reduction amount=20 indicated by the exposure-amount adjustment parameter. Meanwhile, in the second correction region where x is larger than RL−α=5, the adjustment amount AE is decreased according to a sigmoid function.

In the above-described embodiments and the present embodiment, the adjustment amount AE of the first correction region is fixed at the reference reduction amount RE=20. In addition, in the non-correction region where x is equal to or greater than RL+α+1, the adjustment amount AE is fixed at 0. In the present embodiment, in the second correction region, the amount of change in the adjustment amount AE first increases with increasing x, and then decreases. More specifically, in the present embodiment, the amount of change in the adjustment amount AE from x=5 to x=6 is 1, and the amount of change in the adjustment amount AE from x=6 to x=7 is 5. Further, the amount of change in the adjustment amount AE from x=7 to x=8 is 8, the amount of change in the adjustment amount AE from x=8 to x=9 is 5, and the amount of change in the adjustment amount AE from x=9 to x=10 is 1. In this way, the amount of change in the adjustment amount AE at the end portion of the first correction region where the adjustment amount AE is fixed and the second correction region in contact with the non-correction region is reduced. By reducing the amount of change of the adjustment amount AE in regions within the second correction region, which is in contact with the first correction region in which the adjustment amount AE does not change and with the non-correction region, it is possible to suppress a steep variation in the height of the toner at the change points, and thus it is possible to make the density difference difficult to see. In the present embodiment, the sum of the adjustment amounts AE is equivalent to that in the first embodiment. The sum of the adjustment amounts AE corresponds to the amount of exposure reduced by the correction, i.e., the amount of reduction in toner consumption. Therefore, in the present embodiment, a toner reduction effect equivalent to that of the first embodiment can be achieved.

Fourth Embodiment

Next, a fourth embodiment will be described with a focus on differences from the first embodiment and the third embodiment. In the first to third embodiments, the first correction region includes edge pixels. In the present embodiment, the range of the first correction region is the pixels from the y-th pixel (y<RL−α) from the edge to the (RL−α)-th pixel. FIG. 18 illustrates a relation between x and the adjustment amount AE when y=2 when Equation (3) of the first embodiment is used.

For example, when the exposure amount is adjusted by the PWM illustrated in FIG. 7C, a small difference in the height of the toner may occur at the rear edge due to the exposure being on and off. Depending on the intensity of the correction, this small difference in toner height can result in small irregularities in the straight lateral lines. In the present embodiment, fine irregularities can be prevented from occurring by not including the (y−1)-th pixel from the edge in the first correction region and not correcting it.

Each of the above-described embodiments has been described with reference to the image forming apparatus 101. However, the present invention can also be realized as an image processing apparatus that supplies corrected image data to the image forming apparatus. The image processing apparatus includes the image calculation unit 9 illustrated in FIG. 1, and adjusts the exposure amount as described above to generate corrected image data. The image calculation unit 9 of the image processing apparatus functions as an output unit that outputs the generated image data to the image forming apparatus instead of the exposure unit 7. Then, the exposure unit 7 of the image forming apparatus exposes the photoconductor 1 with the correction exposure amount based on the corrected image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-133520, filed Aug. 24, 2022, which is hereby incorporated by reference herein in its entirety.

What is claimed is:
1. An image forming apparatus, comprising:
a photoconductor;
an exposure unit configured to, based on image data, form an electrostatic latent image on the photoconductor by exposing the photoconductor;
a developing unit configured to cause a developer to adhere to the electrostatic latent image and thereby form an image of the developer on the photoconductor; and
at least one processor and at least one memory configured to function as:
a determination unit configured to determine a first correction region, the first correction region being a region which is within a range from where a distance from a first edge of a first image of the developer is a first value to a second value greater than the first value and which is included in the first image, and a second correction region, the second correction region being a region which is within a range from where a distance from the first edge is the second value to a third value greater than the second value and which is included in the first image; and a decision unit configured to, for each of a plurality of first correction target pixels included in the first correction region and a plurality of second correction target pixels included in the second correction region, decide an amount of reduction from an exposure amount according to a pixel value that the image data indicates, wherein the decision unit makes the amount of reduction of each of the plurality of first correction target pixels greater than the amount of reduction of each of the plurality of second correction target pixels.

2. The image forming apparatus according to claim 1, further comprising a first storage unit configured to store first correction information indicating a reference reduction amount, wherein the decision unit is configured to decide the reference reduction amount to be the amount of reduction for each of the plurality of first correction target pixels.

3. The image forming apparatus according to claim 2, wherein the decision unit is configured to decide the amount of reduction for each of the plurality of second correction target pixels by adjusting the reference reduction amount in accordance with a distance from the first edge of each of the plurality of second correction target pixels.

4. The image forming apparatus according to claim 3, wherein the amount of reduction of each of the plurality of second correction target pixels is smaller as the distance from the first edge increases.

5. The image forming apparatus according to claim 4, wherein the amount of reduction of each of the plurality of second correction target pixels becomes linearly smaller as the distance from the first edge increases.

6. The image forming apparatus according to claim 4, wherein an amount of change according to an increase in the distance from the first edge of the amount of reduction of each of the plurality of second correction target pixels is smaller as the distance increases.

7. The image forming apparatus according to claim 4, wherein an amount of change according to an increase in the distance from the first edge of the amount of reduction of each of the plurality of second correction target pixels increases and thereafter decreases as the distance increases.

8. The image forming apparatus according to claim 2, wherein
the first correction information indicates a plurality of reference reduction amounts associated with states of the image forming apparatus, and
the decision unit is configured to select one among the plurality of reference reduction amounts based on a state of the image forming apparatus when forming the image based on the image data, and to decide the selected reference reduction amount to be the amount of reduction of each of the plurality of first correction target pixels.

9. The image forming apparatus according to claim 8, wherein the determination unit is configured to determine the second value and the third value based on the state of the image forming apparatus when forming the image based on the image data.

10. The image forming apparatus according to claim 8, wherein the state of the image forming apparatus is determined by at least one among a temperature, a humidity, and a number of recording materials on which image formation has been performed thus far, when forming the image based on the image data.

11. The image forming apparatus according to claim 1, further comprising a second storage unit configured to store second correction information indicating a correction width and a maximum variation value, wherein the determination unit is configured to, based on the correction width and the maximum variation value, determine the second value and the third value.

12. The image forming apparatus according to claim 11, wherein the determination unit is configured to decide the second value based on a value obtained by subtracting the maximum variation value from the correction width, and decide the third value based on a value obtained by adding the maximum variation value to the correction width.

13. The image forming apparatus according to claim 1, wherein the amount of reduction is indicated by a ratio relative to an exposure amount according to the pixel value that the image data indicates.

14. The image forming apparatus according to claim 1, wherein the plurality of first correction target pixels include a pixel of the first edge.

15. The image forming apparatus according to claim 1, wherein the plurality of first correction target pixels do not include a pixel of the first edge.

16. The image forming apparatus according to claim 1, wherein the first edge is an edge at a rear end of the first image in a rotation direction of the photoconductor.

17. The image forming apparatus according to claim 1, wherein the first edge is all of the edges of the first image.

18. The image forming apparatus according to claim 1, further comprising a correction unit configured to correct the image data based on the amount of reduction for each of the plurality of first correction target pixels and the plurality of second correction target pixels.

19. An image processing apparatus configured to output first image data to an image forming apparatus comprising a photoconductor; an exposure unit configured to form an electrostatic latent image on the photoconductor by exposing the photoconductor; and a developing unit configured to cause a developer to adhere to the electrostatic latent image and thereby form an image of the developer on the photoconductor, the image processing apparatus comprising:
at least one processor and at least one memory configured to function as:
a determination unit configured to determine, based on second image data, a first correction region, the first correction region being a region which is within a range from where a distance from a first edge of a first image of the developer formed from the second image data is a first value to a second value greater than the first value and which is included in the first image, and a second correction region, the second correction region being a region which is within a range from where a distance from the first edge is the second value to a third value greater than the second value and which is included in the first image;
a decision unit configured to, for each of a plurality of first correction target pixels included in the first correction region and a plurality of second correction target pixels included in the second correction region, decide an amount of reduction from an exposure amount according to a pixel value that the second image data indicates; and
a correction unit configured to generate the first image data by correcting the second image data based on the amount of reduction for each of the plurality of first correction target pixels and the plurality of second correction target pixels, wherein the decision unit decides the amount of reduction of each of the plurality of first correction target pixels to be greater than the amount of reduction of each of the plurality of second correction target pixels.

\* \* \* \* \*